United States Patent
Ohman

(10) Patent No.: US 10,788,203 B2
(45) Date of Patent: Sep. 29, 2020

(54) ORC FOR TRANSFORMING WASTE HEAT FROM A HEAT SOURCE INTO MECHANICAL ENERGY AND COMPRESSOR INSTALLATION MAKING USE OF SUCH AN ORC

(71) Applicant: ATLAS COPCO AIRPOWER, NAAMLOZE VENNOOTSCHAP, Wilrijk (BE)

(72) Inventor: Henrik Ohman, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 15/757,299

(22) PCT Filed: Aug. 18, 2016

(86) PCT No.: PCT/BE2016/000038
§ 371 (c)(1),
(2) Date: Mar. 2, 2018

(87) PCT Pub. No.: WO2017/041146
PCT Pub. Date: Mar. 16, 2017

(65) Prior Publication Data
US 2018/0245788 A1    Aug. 30, 2018

Related U.S. Application Data

(60) Provisional application No. 62/215,247, filed on Sep. 8, 2015.

(30) Foreign Application Priority Data

Aug. 17, 2016  (BE) .................................. 2016/5643

(51) Int. Cl.
F22B 1/18          (2006.01)
F01K 25/04         (2006.01)
(Continued)

(52) U.S. Cl.
CPC .......... F22B 1/1838 (2013.01); F01K 21/005 (2013.01); F01K 23/10 (2013.01);
(Continued)

(58) Field of Classification Search
CPC ....... F22B 1/1838; F01K 25/04; F01K 21/005
See application file for complete search history.

(56) References Cited

U.S. PATENT DOCUMENTS 5,816,055 A * 10/1998 Ohman ................... F04C 28/12
                                                          62/117
6,695,602 B2 * 2/2004 Sundstrom ............ F04C 29/042
                                                         184/6.16
(Continued)

FOREIGN PATENT DOCUMENTS

FR    2401380 A1   3/1979
JP    S6477762 A   3/1989
(Continued)

OTHER PUBLICATIONS

JP-2013167241-A English (Year: 2013).*
(Continued)

*Primary Examiner* — Shafiq Mian
(74) *Attorney, Agent, or Firm* — Bacon & Thomas, PLLC

(57) ABSTRACT

An Organic Rankine Cycle (ORC) device and method for transforming waste heat from a heat source containing compressed gas into mechanical energy. The ORC includes a closed circuit containing a two-phase working fluid, the circuit including a liquid pump for circulating the working fluid in the circuit consecutively through an evaporator which is in thermal contact with the heat source; through an
(Continued)

expander like a turbine for transforming the thermal energy of the working fluid into mechanical energy; and through a condenser which is in thermal contact with a cooling element. The ORC determines the mechanical energy generated by the expander. A control device regulates the fraction of the working fluid entering the expander based on the determined mechanical energy such that the mechanical energy generated by the expander is maximum.

16 Claims, 2 Drawing Sheets

(51) Int. Cl.
*F01K 21/00* (2006.01)
*F01K 23/10* (2006.01)
*F01K 25/06* (2006.01)
*F01C 21/04* (2006.01)
*H02K 7/18* (2006.01)

(52) U.S. Cl.
CPC .............. *F01K 25/04* (2013.01); *F01K 25/06* (2013.01); *F01C 21/045* (2013.01); *H02K 7/1823* (2013.01)

(56) References Cited

U.S. PATENT DOCUMENTS

| | | | |
|---|---|---|---|
| 8,276,383 B2 | 10/2012 | Sami | |
| 2007/0175212 A1* | 8/2007 | Uno | F01C 13/04 60/519 |
| 2009/0151356 A1* | 6/2009 | Ast | F01K 23/101 60/660 |
| 2010/0034684 A1 | 2/2010 | Ast | |
| 2010/0154419 A1* | 6/2010 | Kontomaris | C09K 5/047 60/645 |
| 2010/0269503 A1* | 10/2010 | Lengert | F01K 25/02 60/645 |
| 2010/0320764 A1* | 12/2010 | Myers | F01D 15/10 290/52 |
| 2012/0286524 A1* | 11/2012 | Bronicki | F01K 13/02 290/40 B |
| 2012/0312009 A1 | 12/2012 | Smith | |
| 2013/0067951 A1* | 3/2013 | Fujioka | F25B 9/06 62/502 |
| 2013/0160449 A1* | 6/2013 | Cogswell | F01K 23/04 60/653 |
| 2014/0075941 A1 | 3/2014 | Adachi et al. | |
| 2017/0002695 A1* | 1/2017 | Kim | F01K 25/04 60/653 |
| 2018/0252120 A1* | 9/2018 | Ohman | F01K 11/00 60/653 |

FOREIGN PATENT DOCUMENTS

| | | | | |
|---|---|---|---|---|
| JP | 2013167241 A | * | 8/2013 | .......... F01K 23/065 |
| JP | 2013167241 A | | 8/2013 | |
| JP | 2014058877 A | | 4/2014 | |
| WO | WO-2012016647 A1 | * | 2/2012 | .......... F01K 23/065 |

OTHER PUBLICATIONS

WO-2012016647-A1 English (Year: 2012).*
International Search Report dated Jan. 23, 2017 on PCT/BE2016/000038.

* cited by examiner

ORC FOR TRANSFORMING WASTE HEAT FROM A HEAT SOURCE INTO MECHANICAL ENERGY AND COMPRESSOR INSTALLATION MAKING USE OF SUCH AN ORC

The present invention relates to an ORC for transforming waste heat from a heat source into mechanical energy and compressor installation making use of such an ORC for transforming its waste compression heat into mechanical energy.

BACKGROUND OF THE INVENTION

Power cycles for WTP (Waste heat To Power) are well described, such as ORC, Kalina, Trilateral Flash etc.

Such power cycles are designed to recover waste heat produced for example by a compressor and to transform said energy into useful mechanical energy that can be used for instance for driving a generator for generating electrical power.

The use of an ORC (Organic Rankine Cycle) is in particular known to recover waste energy of heat sources with relatively high temperature like the heat of compressed gas produced by a compressor installation.

Such known ORC's comprise a closed loop circuit containing a two-phase working fluid, the circuit further comprising a liquid pump for circulating the fluid in the circuit consecutively through an evaporator which is in thermal contact with the heat source to evaporate the working fluid; through an expander like a turbine for transforming the thermal energy transmitted to the gaseous working fluid produced in the evaporator into useful mechanical energy; and finally through a condenser which is in thermal contact with a cooling medium like water or ambient air in order to transform the gaseous working fluid into liquid that can be returned to the evaporator for the next working cycle of the working fluid.

In compressor installations the ORC is used for cooling the hot gasses produced by compression by bringing these hot gasses in contact with the evaporator of the ORC and at the same time to use the ORC for transforming the heat recovered in the evaporator into useful energy in the expander.

The waste heat in compressor installations is available at relatively high temperatures, typically at 150° C. or higher. At the same time, the cooling needs to reduce the hot compressed gasses to very low levels, typically less than 10° C. above the temperature of the working fluid at the entry of the evaporator.

The known power cycles for WTP, designed to operate between the temperature levels of the working fluid such as cooling water and the compressed gas, are faced with a performance dilemma in that they require choosing between two alternatives.

Either the power cycle uses all the available waste heat present in the compressed gas, but suffers from a very low cycle efficiency or the power cycle uses only a part of the heat and will only partially cool the compressed gas but at a relatively high efficiency. In the last case, a separate air cooler is required after the power cycle evaporator in order to reach the correct cooling of the compressed gas.

The known power cycles have been adopted to be suitable for heat sources such as compressed gas, which have the difficulty that the temperature of the compressed gas varies, meaning that the waste heat available varies over time.

A first approach is to cool the compressed gas with a cooling agent, often water, then cooling the cooling agent with a power cycle, which in turn in cooled by cooling water of ambient air. This solution introduces very large thermodynamic losses, due to the heat exchange across large temperature differences, and leads to very low system efficiency.

A second approach is working with varying temperature evaporation, such as Kalina cycles and supercritical ORC. Also an ORC operating with zeotropic fluid mixes as a working fluid is a known approach to reduce the thermodynamic losses due to varying temperature evaporation. This approach leads to technically complex and therefore expensive systems.

SUMMARY OF THE INVENTION

It is an objective of the present invention to give a solution to one or more of the above-mentioned and other disadvantages.

Therefore the invention aims an ORC for transforming waste heat from a heat source containing compressed gas into mechanical energy, the ORC comprising a closed circuit containing a two-phase working fluid, the circuit comprising a liquid pump for circulating the working fluid in the circuit consecutively through an evaporator which is in thermal contact with the heat source; through an expander like a turbine for transforming the thermal energy of the working fluid into work; and through a condenser which is in thermal contact with a cooling element, whereby the ORC is equipped with means for determining the mechanical energy generated by the expander and a control device that regulates the vapour fraction of the working fluid entering the expander, whereby the control device will regulate the afore-mentioned vapour fraction based on the determined mechanical energy such that the mechanical energy generated by the expander is maximum.

By regulating the vapor fraction, the ratio of liquid to gaseous or vaporous working fluid entering the expander will be adjusted.

The mechanical energy generated by the expander can be considered as the ORC output power.

An advantage of such an ORC according to the invention is that it uses a variable vapour fraction at the entry of the expander to adapt to the compressed gas temperature variations, such that a higher efficiency can be obtained compared to conventional ORC and Trilateral Flash cycles.

Another advantage is that an ORC according to the invention is less complex and less costly than variable evaporation temperature systems such as Kalina cycles, supercritical ORC's and ORC's with zeotropic fluid blends.

It is important to note that in the evaporator, which is in thermal contact with the compressed gas, the working fluid will be heated to its boiling temperature and thereafter to at least partially evaporate the working fluid.

In other words: the ratio of heat used for preheating to the heat used for evaporation is increased by only evaporating part of the working fluid.

This mixture of liquid working fluid and evaporated or vapourous or gaseous working fluid will enter the expander.

By lowering for example the pump capacity, the amount of liquid working fluid that is evaporated in the evaporator can be increased, i.e. more heat is used for the evaporation.

This will reduce the average temperature difference in the evaporator between the working fluid absorbing heat and the compressed gas emitting the heat, yet at the same time the physical evaporation temperature of the fluid is constant.

This will overcome the performance dilemma related to the temperature difference between the working fluid and the compressed gas that the known power cycles for WTP are confronted with, as explained above.

According to a preferred embodiment the control device will regulate the vapour fraction of the working fluid entering the expander, by varying the working fluid flow through the pump and/or by varying the working fluid flow through the expander.

Varying the working fluid flow through the pump or expander means that the pump or expander capacity is varied.

The control device will regulate the pump and/or expander capacity and as a consequence the vapour fraction of the working fluid entering the expander in function of the mechanical energy generated by the expander. In particular, the control device will regulate the pump and/or expander capacity such that this mechanical energy is maximum.

It is clear however, that many other regulations can be conceived for varying the vapour fraction of the working fluid entering the expander. Any regulation which can vary the vapour fraction of the working fluid entering the expander can be used for the pending invention. Preferably, the control device will regulate the vapour fraction of the working fluid entering the expander in a continuous manner.

Such a regulation will allow that the vapour fraction of the working fluid entering the expander is variable.

This means that the control device will respond to changing operating conditions such that an optimal efficiency, i.e. a maximum WTP power output, can be achieved at all operating conditions.

The present invention also relates to a compressor installation comprising a compressor element for compressing a gas and a cooler for cooling the compressed gas, whereby the compressor installation also comprises an ORC circuit according to the invention and whereby the above-mentioned cooler is integrated in an heat exchanger which also integrates the evaporator of the ORC for heat transfer between the cooler and the evaporator.

BRIEF DESCRIPTION OF THE DRAWINGS

With the intention of better showing the characteristics of the invention, hereafter, as an example without any limitative character, some preferred embodiments are described of an ORC according to the invention for transforming waste heat from a heat source into mechanical energy and of a compressor installation making use of such an ORC, with reference to the accompanying drawings, wherein.

DETAILED DESCRIPTION OF THE INVENTION

Figure 1:
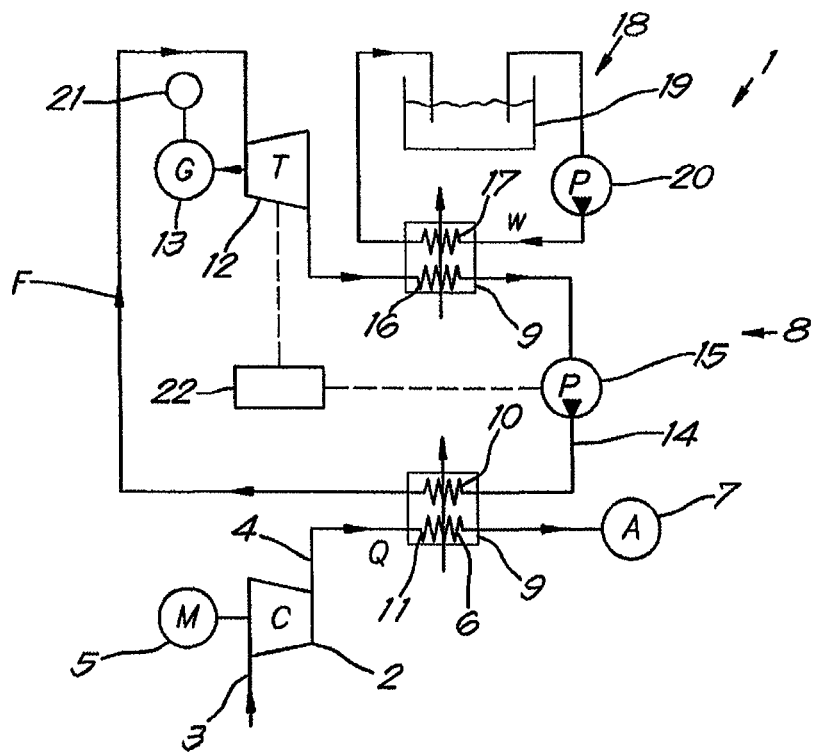
FIG. 1 schematically represents a single stage compressor installation making use of an ORC system according to the invention.

The compressor installation 1 represented in FIG. 1 comprises a compressor element 2 with an inlet 3 and an outlet 4 and driven by a motor 5 for compressing a gas flow Q and a cooler 6 for cooling the compressed gas before it is supplied to a net 7 of consumers of compressed gas.

The afore-mentioned gas can be for example air or nitrogen. However, the invention is not limited thereto.

The compressor installation 1 further comprises an ORC 8 according to the invention wherein the above-mentioned cooler 6 is integrated in an heat exchanger 9 which also integrates the evaporator 10 of the ORC 8 for recovering the waste heat of the compressed gas used as a heat source 11 and transforming said heat into useful mechanical energy by means of an expander 12 of the ORC 8, for example a turbine driving an electrical generator 13 as shown in the example of FIG. 1.

The ORC 8 comprises a closed circuit 14 containing a two-phase organic working fluid with a boiling temperature below the temperature of the heat source 11, i.e. the compressed gas, the working fluid being continuously circulated around in the circuit 14 by means of a liquid pump 15 in the direction as indicated with arrows F.

The working fluid is made to flow consecutively through the evaporator 10 which is in thermal contact with the heat source 11; then through the expander 12 and finally through a condenser 16 before being launched again by the pump 15 for a next cycle in the circuit 14.

The condenser 16 is, in this example, in thermal contact with a cooling element 17 of a cooling circuit 18 which, in the example of FIG. 1, is represented as a supply of cold water W taken from a tank 19 to circulate through the condenser 16 by means of a pump 20.

According to the invention, the ORC 8 is equipped with means 21 for determining the mechanical energy generated by the expander 12.

These means 21 can be for example a Power meter or Power sensor.

The ORC 8 is further equipped with a control device 22 that can regulate the vapour fraction of the working fluid entering the expander 12.

Normal operation of the ORC 8 according to the invention is that the control device 22 will regulate the afore-mentioned vapour fraction based on the determined mechanical energy by the means 21 such that the mechanical energy is maximum.

In the example of FIG. 1 and according to a preferred characteristic of the invention, the control device 22 will regulate the vapour fraction of the working fluid entering the expander 12, by varying the working fluid flow through the pump 15 and by varying the working fluid flow through the expander 12.

It is of course also possible that the control device 22 will only regulate the expander 12 or the pump 15.

In this case however, the control device 22 will regulate the vapour fraction of the working fluid entering the expander 12 by switching repeatedly between two control algorithms.

A first control algorithm consists of varying the working fluid flow through the pump 15 until the mechanical energy generated by the expander 12 is at a local maximum.

The second control algorithm consists of varying the working fluid flow through the expander 12 until the mechanical energy generated by the expander 12 is at a further optimize maximum.

The control device 22 will vary the working fluid flow through the expander 12 or the pump 15, i.e. vary the expander 12 or pump 15 capacity, and at the same time determine the mechanical energy generated by the expander 12, i.e. determine the ORC power output, and will select the expander 12 or pump 15 capacity for which the determined the ORC power output is at a maximum.

After the first control algorithm, the ORC power output will be optimized in function of only the pump 15 capacity. This means that the ORC power output will be at a local maximum.

By applying the second control algorithm, the ORC power output will be optimized in function of the expander 12 capacity, such that an optimized maximum can be reached.

By switching again to the first control algorithm, the ORC power output will be optimized again in function of the pump 15, such that changes in operating conditions can and will be taken into account.

Such changes in operation conditions are: changes in the temperature of the compressed air to be cooled, changes in the flow of the compressed air, changes in ambient temperatures, changes in cooling water flow, changes in cooling water temperature or changes in heat exchanger efficiency.

By applying such a regulation, the control device 22 will regulate the vapour fraction of the working fluid entering the expander 12 in a continuous manner, such that changes in operating conditions can be readily acted upon.

In this way, a maximum ORC power output can be guaranteed under all operating conditions.

In order to vary the working fluid flow through the expander 12, several options are possible.

The expander 12 capacity can be varied by means of varying the speed of the expander 12, as in the present example or by means of a by-pass over the expander 12, by means or slide valves and/or lift valves, by varying swept volume of the expander 12 or by means of varying the oil injection of the expander 12.

Also to vary the working fluid flow through the pump 15, several options are possible.

The pump 15 capacity can be varied by means of varying the speed of the pump 15, as in the present example or by means of a by-pass over the pump 15, by means of varying swept volume of the pump 15 or by means of varying the on-off frequency of the pump 15.

According to a preferred embodiment of the invention, the vapour fraction of the working fluid entering the expander 12 is between 10% and 99% mass fraction. It is of course also possible that the vapour fraction of the working fluid entering the expander 12 is kept between different limits, for example between 20% and 95% mass fraction or between 40% and 90% mass fraction.

The expander 12 can be any kind of expander 12 capable of generating mechanical energy by expansion of a two phase fluid supply, i.e. a mixture of liquid and gaseous working fluid. Preferably, a volumetric expander 12 like a screw expander 12 or a mechanical cylinder or the like which can accept a mixture of liquid and gaseous working fluid.

The compressor element 2 can also be of any kind, in particular an oil free air compressor element 2.

It is also clear that the cooling of the condenser 16 can be realized in other ways than in the example of FIG. 1, for example by blowing ambient air over the condenser 16 by means of a fan or the like.

Preferably a working fluid is used of which the boiling temperature is lower than 90° C. or even lower than 60° C., depending on the temperature of the available heat source 11, i.e. the temperature of the compressed gas to be cooled.

An example of a suitable organic working fluid is 1,1,1,3,3-pentafluoropropaan. The working fluid could be mixed with a suitable lubricant for the lubrication of at least part of the moving parts of the ORC 8.

Alternatively, the working fluid itself could act as a lubricant, meaning that a working fluid is chosen which has lubricating properties.

Figure 2:
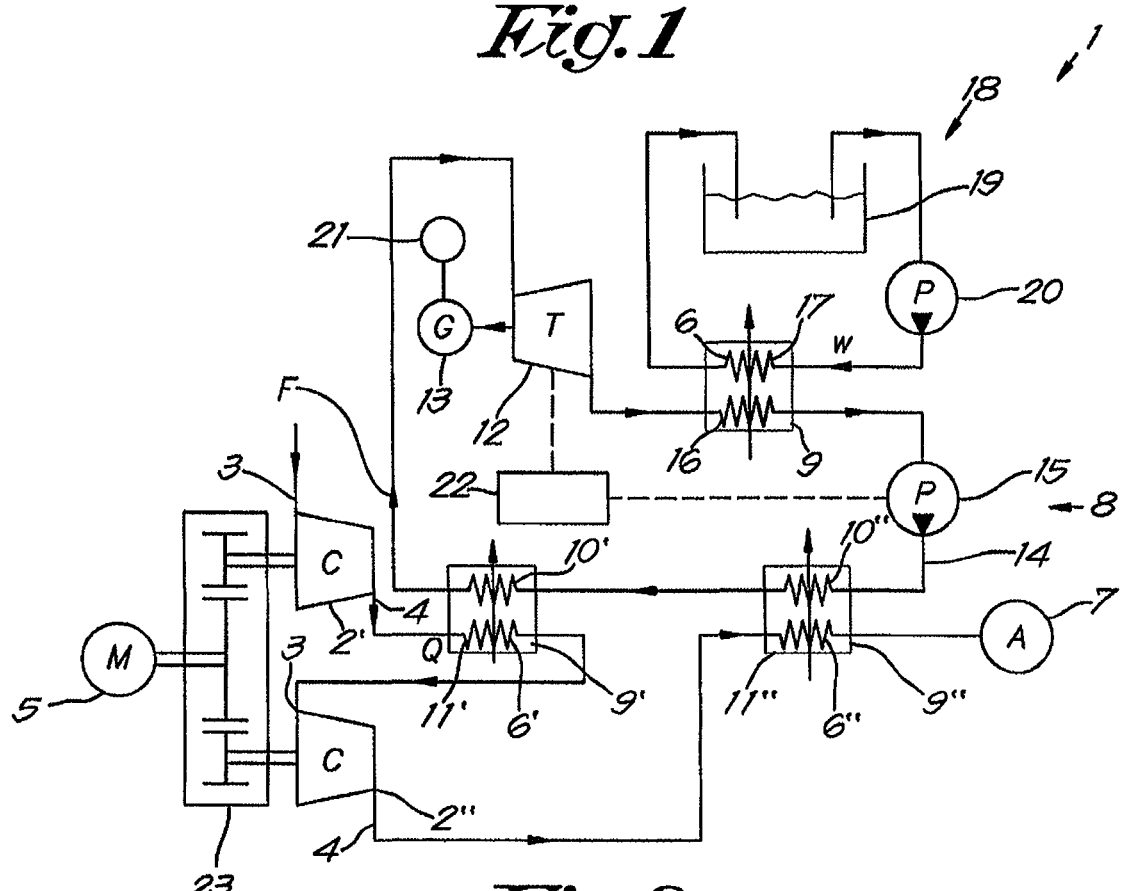
FIG. 2 schematically represents a multi stage compressor installation according to the invention.

In FIG. 2 a multistage compressor installation 1 according to the invention is represented with in this case two compressor elements, a first stage compressor element 2' and a last stage compressor element 2" respectively, which elements 2' and 2" are driven via a gearbox 23 by a single motor 5 and are connected in series for compressing a gas in two incremental pressure stages.

The compressor elements 2', 2" can also be of any kind, in particular an oil free air compressor elements.

The installation 1 is provided with a intercooler 6' for cooling the gas compressed by the first stage compressor element 2' before it is supplied to the next element 2" and an aftercooler 6" for cooling the gas compressed by the last stage compressor element 2" before it is supplied to the net 7.

Each of the above-mentioned coolers 6' and 6" is integrated in an heat exchanger 9' and 9", which also integrates part of the evaporator 10 of the ORC 8.

In the example shown, the ORC comprises two evaporators 10' and 10" connected in series in the circuit 14, although it would not be excluded to have only one evaporator 10 of which a part 10' is in thermal contact with the intercooler 6', whilst another part 10" is in thermal contact with the aftercooler 6".

Also in this case the control device 22 will be regulated according to the same method as in FIG. 1.

In that case the same advantages apply as in the single stage compressor element of FIG. 1.

Figure 3:
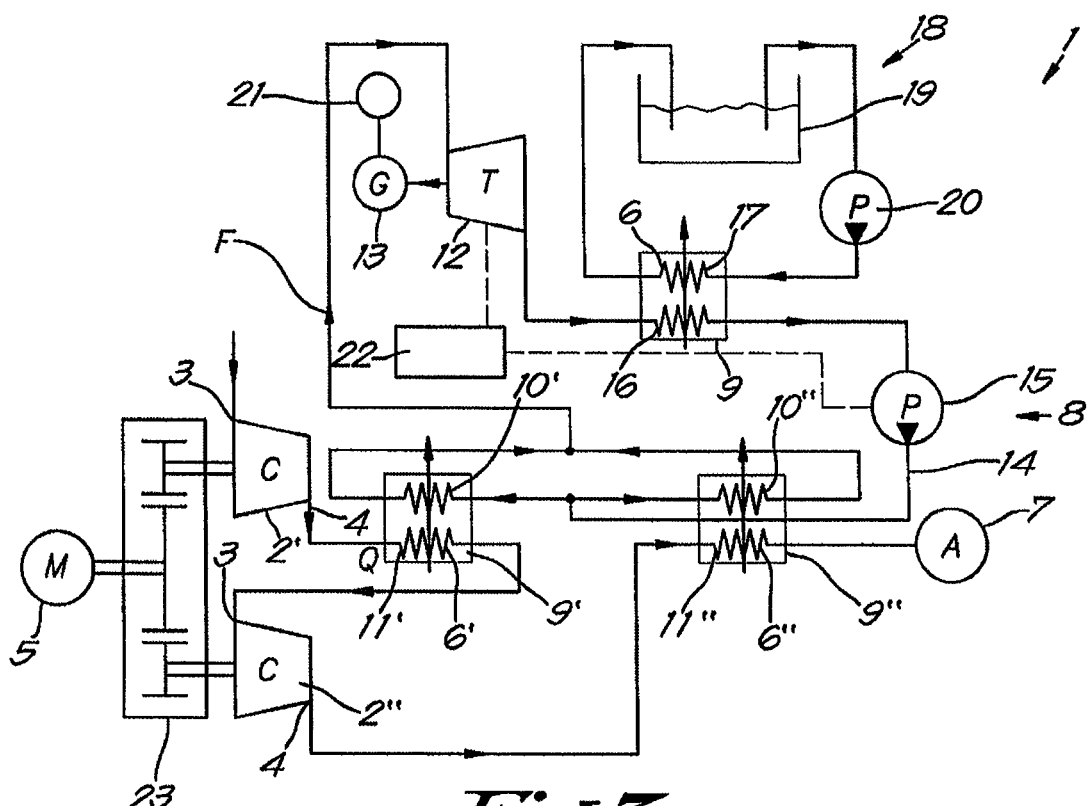
FIGS. 3 to 4 represent different embodiments of the multi stage compressor installation according of FIG. 2.
Figure 4:
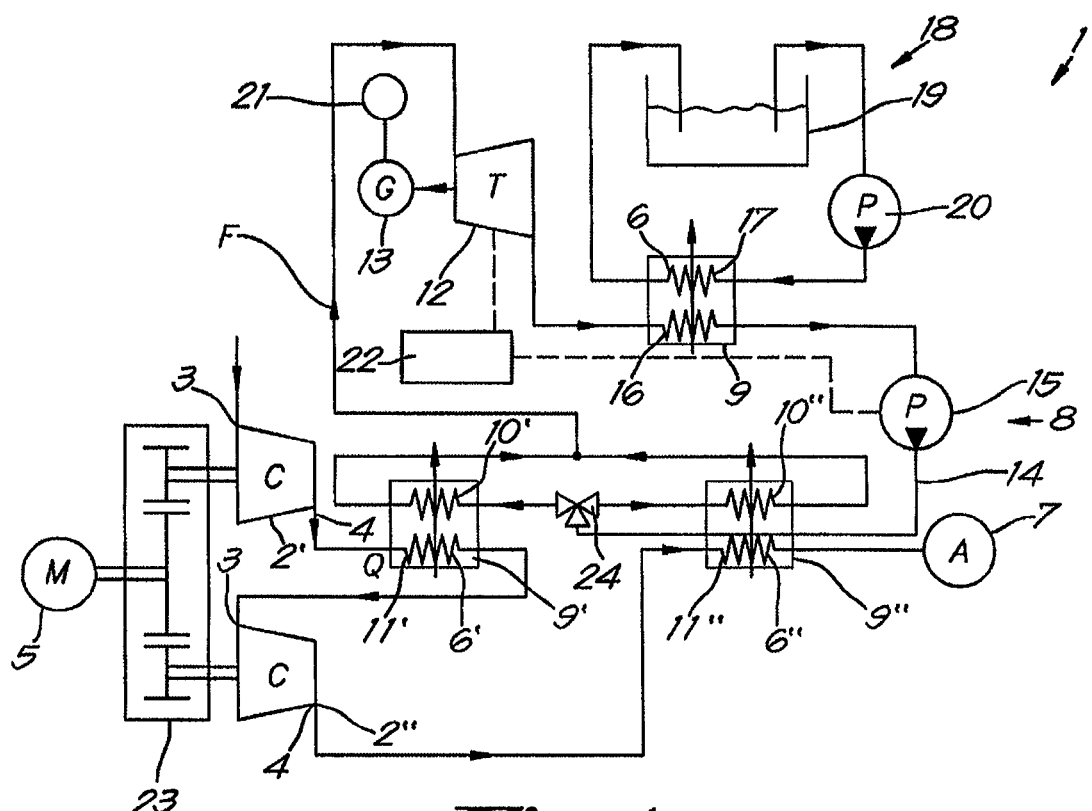

FIG. 3 gives another example of a multistage compressor installation 1 according to the invention which differs from the embodiment of FIG. 4 in that the evaporators 10' and 10" are connected in parallel instead of in series but still with the same advantages.

FIG. 4 illustrates an alternative of the installation 1 of FIG. 3 comprising additionally an three way valve 24 in order to split the flow of the working fluid coming from the pump 15 into two suitable separate flows through the evaporators 10' and 10".

Instead of using a three way valve 24 one or two restrictions or a combination of a restriction and a valve could be used in the branches of parallel circuit connecting the evaporators 10' and 10".

The present invention is in no way limited to the form of embodiments described by way of an example and represented in the figures, however, such an ORC according to the invention for transforming waste heat from a heat source into mechanical energy and of a compressor installation making use of such an ORC can be realized in various forms without leaving the scope of the invention.

The invention claimed is:

1. An Organic Rankine Cycle (ORC) installation for transforming waste heat from a heat source containing compressed gas into mechanical energy, the ORC comprising:
   a closed circuit containing a two-phase working fluid,
   the closed circuit comprising a liquid pump for circulating the two-phase working fluid in the closed circuit consecutively through an evaporator which is in thermal contact with the heat source; through an expander for transforming the thermal energy of the two-phase working fluid into mechanical energy; and through a condenser which is in thermal contact with a cooling element, wherein the ORC installation is equipped with a determiner of output power generated by the expander and a control device that regulates a vapor fraction of the two-phase working fluid entering the expander, wherein the control device is configured to regulate the vapor fraction based on the output power such that the output power generated by the expander is maximum and wherein the expander is configured to accept a mixture of liquid and gaseous working fluid, wherein the determiner is a power meter or a power sensor that measures the output power generated by the expander.

2. The ORC installation according to claim 1, wherein the control device is configured to regulate the vapor fraction of the working fluid entering the expander, by varying the working fluid flow through the pump and/or by varying the working fluid flow through the expander.

3. The ORC installation according to claim 1, wherein the control device is configured to regulate the vapor fraction of the working fluid entering the expander in a continuous manner.

4. An Organic Rankine Cycle (ORC) installation for transforming waste heat from a heat source containing compressed gas into mechanical energy, the ORC comprising:

a closed circuit containing a two-phase working fluid, the closed circuit comprising a liquid pump for circulating the two-phase working fluid in the closed circuit consecutively through an evaporator which is in thermal contact with the heat source; through an expander for transforming the thermal energy of the two-phase working fluid into mechanical energy; and through a condenser which is in thermal contact with a cooling element, wherein the ORC installation is equipped with a determiner of mechanical energy generated by the expander and a control device that regulates a vapor fraction of the two-phase working fluid entering the expander, wherein the control device is configured to regulate the vapor fraction based on the determined mechanical energy such that the mechanical energy generated by the expander is maximum and wherein the expander is configured to accept a mixture of liquid and gaseous working fluid, wherein the control device is configured to regulate the vapor fraction of the working fluid entering the expander, by varying the working fluid flow through the pump and/or by varying the working fluid flow through the expander, wherein the vapor fraction of the working fluid entering the expander is further regulated by switching repeatedly between two control algorithms, whereby the first control algorithm consists of varying the working fluid flow through the pump until the mechanical energy generated by the expander is at a local maximum and the second control algorithm consists of varying the working fluid flow through the expander until the mechanical energy generated by the expander is at a further optimized maximum.

5. The ORC installation according to claim 2, wherein the variation of the working fluid flow through the expander is realized by a by-pass over the expander, by a varying of a speed of the expander, by slide valves and/or lift valves, by varying a swept volume of the expander or by a varying of the oil injection of the expander.

6. The ORC installation according to claim 2, wherein the variation of the working fluid flow through the pump is realized by a by-pass over the pump, by a varying of a speed of the pump, by a varying of a swept volume of the pump or by a varying of the on-off frequency of the pump.

7. The ORC installation according to claim 1, wherein the vapor fraction of the working fluid entering the expander is between 10% and 99% mass fraction.

8. The ORC installation according to claim 1, wherein the expander is a volumetric expander or that the expander is a screw expander.

9. The ORC installation according to claim 1, wherein a working fluid is used which comprises a lubricant or which acts as a lubricant.

10. The ORC installation according to claim 1, wherein a working fluid is used of which the boiling temperature is lower than 90° C.

11. A compressor installation comprising:

a compressor element for compressing a gas and a cooler for cooling the compressed gas, and an ORC installation for transforming waste heat from a heat source containing compressed gas into mechanical energy, the ORC comprising:

a closed circuit containing a two-phase working fluid, the closed circuit comprising a liquid pump for circulating the two-phase working fluid in the closed circuit consecutively through an evaporator which is in thermal contact with the heat source; through an expander for transforming the thermal energy of the two-phase working fluid into mechanical energy; and through a condenser which is in thermal contact with a cooling element, wherein the ORC installation is equipped with a determiner of output power generated by the expander and a control device that regulates a vapor fraction of the two-phase working fluid entering the expander, wherein the control device is configured to regulate the vapor fraction based on the output power such that the output power generated by the expander is maximum and wherein the expander is configured to accept a mixture of liquid and gaseous working fluid, wherein the cooler is integrated in an heat exchanger which also integrates the evaporator of the ORC for heat transfer between the cooler and the evaporator, wherein the determiner is a power meter or a power sensor that measures the output power generated by the expander.

12. The compressor installation according to claim 11, further comprising a multistage compressor installation with at least two compressor elements connected in series for compressing a gas and at least two coolers acting either as an intercooler between two compressor elements or as an aftercooler for cooling the gas compressed by the last stage compressor element, whereby the compressor installation comprises an ORC with at least one evaporator, whereby each above-mentioned coolers is integrated in an heat exchanger which also integrates at least part of the evaporator of the ORC.

13. The compressor installation according to claim 12, wherein the evaporator of the ORC is composed of a plurality of evaporators or evaporator parts, each evaporator or evaporator part being integrated together with an intercooler or with an aftercooler in a heat exchanger, the evaporators or evaporator parts of the ORC being fluidly connected in series or in parallel in the ORC circuit.

14. The compressor installation according to claim 13, wherein the evaporators or evaporator parts are connected in parallel and are configured to divide the flow of the working fluid coming from the pump into separate flows through the evaporators or evaporator parts.

15. The compressor installation according to claim 14, wherein the configuration to divide the flow of the working fluid over the evaporators or evaporator parts comprises a three way valve or by a restriction and/or a valve.

16. The compressor installation according to claim 11, wherein the compressor element or compressor elements are oil free air compressor elements.

* * * * *